United States Patent [19]
Ernst

[11] 4,431,233
[45] Feb. 14, 1984

[54] SAFETY SEAT FOR MOTOR VEHICLES

[75] Inventor: Hans-Hellmut Ernst, Sülfeld, Fed. Rep. of Germany

[73] Assignee: Autoflug GmbH, Rellingen, Fed. Rep. of Germany

[21] Appl. No.: 239,591

[22] Filed: Mar. 2, 1981

[30] Foreign Application Priority Data

Feb. 29, 1980 [DE] Fed. Rep. of Germany ....... 3007745

[51] Int. Cl.³ ............................................. A47C 00/00
[52] U.S. Cl. .................................... 297/468; 280/801; 297/475; 297/481; 297/482; 297/483
[58] Field of Search .............. 297/468, 475, 476, 477, 297/478, 482, 481; 280/801, 808; 264/DIG. 83

[56] References Cited

U.S. PATENT DOCUMENTS

| | | | |
|---|---|---|---|
| 3,287,063 | 11/1966 | Nicholas | 297/475 |
| 3,291,526 | 12/1966 | Nicholas | 297/482 |
| 3,343,764 | 9/1967 | Webb, Jr. | 297/476 X |
| 3,455,603 | 7/1969 | Nicholas | 297/475 |
| 3,620,569 | 11/1971 | Mathis | 297/478 |
| 3,663,057 | 5/1972 | Lohr et al. | 297/475 |
| 3,811,703 | 5/1974 | Turkovich | 297/482 X |
| 3,887,233 | 6/1975 | Garavaglia | 297/478 |
| 4,102,833 | 7/1978 | Salisbury | 264/DIG. 83 |

FOREIGN PATENT DOCUMENTS 749809   1/1967   Canada ................. 297/482

Primary Examiner—James T. McCall
Attorney, Agent, or Firm—Becker & Becker, Inc.

[57] ABSTRACT

A safety seat for motor vehicles, with a safety belt, particularly a three-point belt, stored in an automatic belt roll-up device, and including a lock tongue, a belt lock arranged at the door side of the vehicle, and a flexible, restorable belt-strap guide, which is connected to the seat and/or the belt roll-up device, and is hollow to form a passage for the belt strap which is movable in the guide in the longitudinal direction. The belt-strap guide is limited in length in the manner of a stump. With the safety belt open, the free end of the guide extends essentially straight and forms an abutment or a receiving opening for the lock tongue in the region of the outlet opening for the belt-strap. With the safety belt closed, the belt-strap guide bends elastically under the effect of belt-strap forces in the direction of the path of the particular belt segment.

30 Claims, 10 Drawing Figures

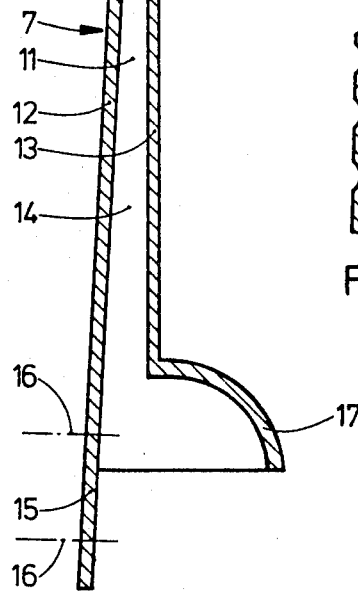
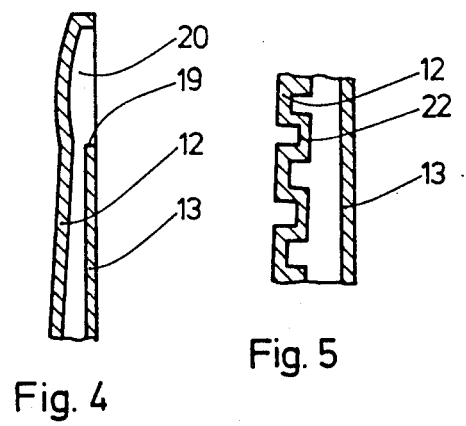
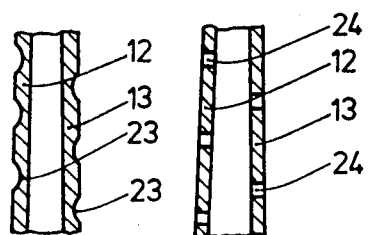
Fig. 3  Fig. 4  Fig. 5  Fig. 6  Fig. 7  Fig. 8

SAFETY SEAT FOR MOTOR VEHICLES

The present invention concerns a safety seat for motor vehicles, with a safety belt, particularly a three-point belt, stored in an automatic belt roll-up device, and includes a lock tongue, and a belt lock arranged at the door side of the vehicle.

Such safety seats are known. With conventional arrangements of safety belts, the belt roll-up means and metal fittings of which are fastened to the structure of the motor vehicle, and the belt lock of which is arranged on the side of the seat away from the door, the problem arises, with the safety belt being open, to hold the lock tongue in such a position that it can be easily reached or grasped. This occurs according to German Auslegeschrift No. 21 66 822 by a pivotable lever projecting in a dangerous manner.

A further problem results therefrom that, with belt roll-up means integrated in the safety seat, the belt straps come out of the safety seat relatively close to the person sitting on the seat, and when putting on the safety belt, i.e. during pulling on the lock tongue, the belt straps are more or less slidingly drawn or dragged over parts of the clothing of the person on the seat. On the other hand, however, the arrangement of the belt lock on the door side of the seat has the advantage that the belt lock is more easily accessible, and that after an accident rescuers can open the safety belt more easily.

With a safety belt arrangement on a seat which has a lap belt and two shoulder straps, a belt-strap guide for the lap belt is known which serves not only for storing the lap belt, but additionally also forms the abutment or support for both shoulder straps (German Offenlegungsschrift No. 22 22 251). Accordingly, this belt-strap guide must be embodied relatively rigidly to be able to absorb or receive the forces of both shoulder straps. This belt-strap guide can be adapted only roughly to the shape of the body. An adaptation to various body shapes is not possible. Since this belt-strap guide extends essentially over the entire width of the seat, it is uncomfortable. The same is also true for putting on and taking off this safety belt, because the belt-strap guide is secured to pivot arms which are mounted in the upper part of the back rest of the seat, so that with an open safety belt, the belt-strap guide remains pivoted upwardly, which means partially or entirely as far as over the head of the person on the seat. A similar situation exists with a static three-point belt according to German Auslegeschrift No. 19 58 671.

It is an object of the present invention, with a safety seat of the initially described type, to hold the lock tongue, when the safety belt is open, in a more advantageous position for being reached or grasped, and, when putting on the safety belt, to avoid a drawing or dragging of the belt strap over the clothing of the person on the seat.

This object, and other objects and advantages of the present invention, will appear more clearly from the following specification in connection with the accompanying drawings, in which:

FIG. 3 is a longitudinal section taken through a belt-strap guide having a hollow profile;

FIGS. 4, 5, 6, 7 and 8 show partially modified embodiments of the belt-strap guide of FIG. 3;

Figure 1:
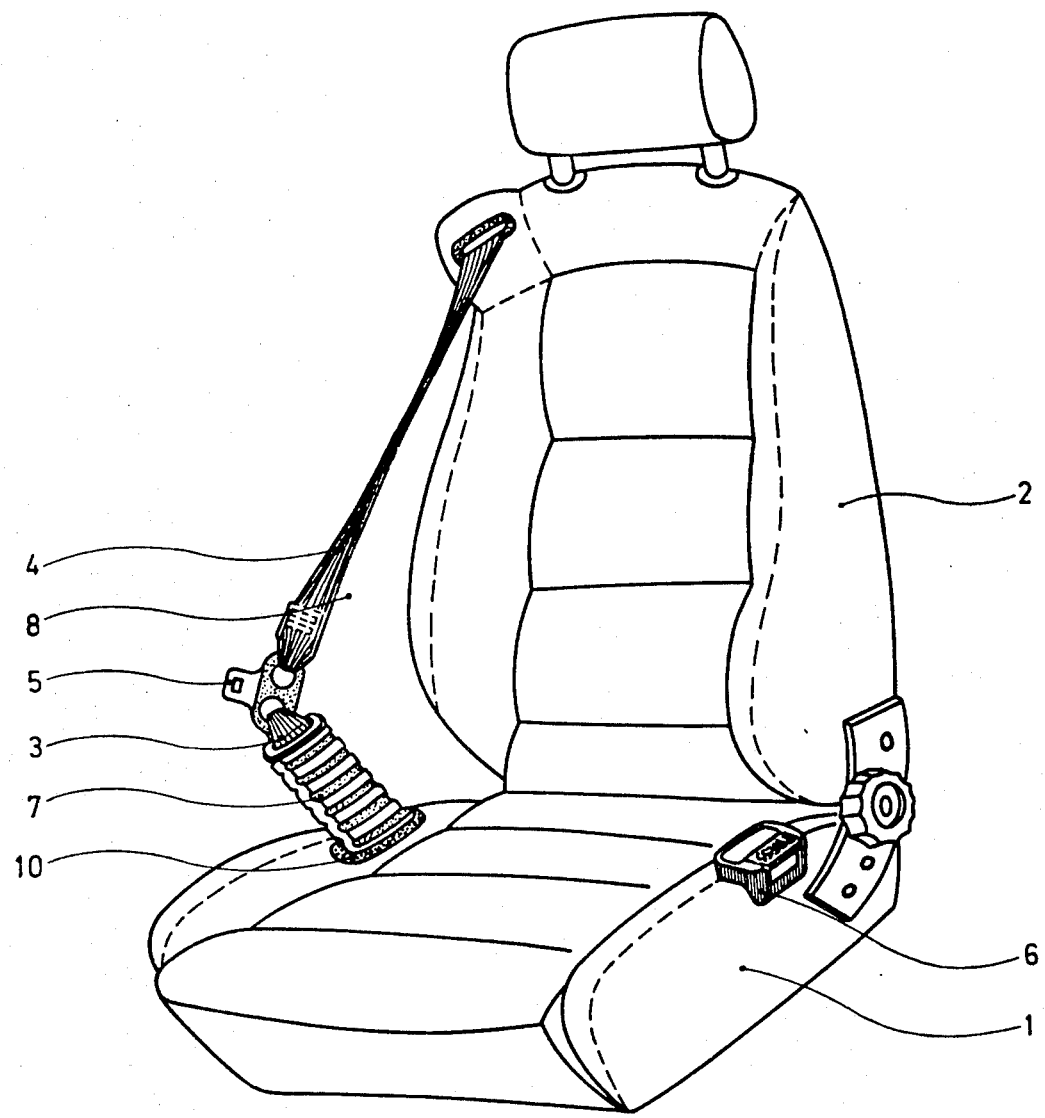
FIG. 1 illustrates one embodiment of a motor vehicle safety seat with an integrated three-point safety belt.

The safety seat of the present invention is characterized primarily by a flexible, restorable belt-strap guide which is hollow to form a passage for the belt strap which is movable in the guide in the longitudinal direction. The belt-strap guide is connected to the seat and/or the belt roll-up device, and is limited in length in the manner of a stump. With the safety belt open, the free end of the guide extends essentially straight and forms an abutment or a receiving opening for the lock tongue in the region of the outlet opening for the belt strap. With the safety belt closed, the belt-strap guide bends elastically under the effect of belt-strap forces in the direction of the path of the particular belt segment.

With the present inventive safety seat, the belt-strap guide fulfills a dual function. Basically, the belt-strap guide needs to extend over only a relatively short distance. Lengths between approximately 10 cm and 25 cm can be sufficient. Taking into consideration the elasticity of the belt-strap guide and the return or retracting forces resulting therefrom, the belt-strap guide, with an open safety belt, always occupies an essentially extended position, whereby the lock tongue, under the influence of the belt-strap tension at the abutment or support, is held in the region of the outlet opening for the belt strap.

With an arrangement of the belt-strap guide on the side of the seat away from the door, it is advantageous when the belt-strap guide extends essentially vertically and in such a manner that also during engagement or putting on of the safety belt, it is bent only in one direction. Accordingly, an individual can enter the can through the car door and occupy the seat without obstruction by the safety belt or parts thereof. The safety belt is then engaged or put on in a conventional manner in that the lock tongue is grasped, is moved in the direction toward the belt lock, and is introduced into the belt lock. Under the effect of the belt-strap forces during elastic deformation, the belt-strap guide then engages against the adjoining part of the body, for instance the lap of a seated individual. Since this engagement occurs already at the beginning of the putting-on procedure, the involved body part, or the contacted clothing, remains protected against direct wear caused by the belt strap, because the belt strap in this region is passed through the belt-strap guide. A corresponding wear in the region of the belt lock generally does not occur with this type of putting-on of the belt.

A similar situation is also true for an embodiment with a three-point safety belt, with which a safety strap emerges from the back of the seat in its upper region. To assure that the lock tongue, after opening of the safety belt, always again occupies the same position advantageous for grasping, it is recommended to install a stronger return or retracting spring in the belt roll-up device for the lap strap than in the belt roll-up device for the shoulder strap, so that the lock tongue is aways held at the end of the belt-strap guide for the lap strap. It can always be arranged that between the belt-strap guide for the lap strap, and the shoulder strap or its belt-strap guide, there remains a sufficient free space for the shoulder or arm of the seated individual.

Several possibilities exist for the specific embodiment of the belt-strap guide. Simpler embodiments comprise a hollow profile with a rectangular horizontal cross section, with one end being connected in a suitable manner to the seat or the belt roll-up device. The desired elasticity can be attained by suitable selection of the material and strength thereof. Additionally, the walls of the hollow profile can be weakened at least in some regions in such a way that in this region the elasticity is increased. It is also possible to vary the elasticity of the belt-strap guide more or less continuously from one end to the other.

Other embodiments comprise profiled sections which are supported and/or held on; at least one spring extending over the length of the belt-strap guide. In this case, harder materials, especially synthetic materials, can be used.

In particular, with a three-point safety belt, on that side of the seat or the rest facing away from the door, a belt-strap guide is respectively provided for both straps, whereby with the safety belt, the belt-strap guide for the lap strap extends essentially vertically, and the belt-strap guide for the diagonal shoulder strap extends essentially horizontally; the guides are of such a length that between the straps and the seat there remains a free space, for example for the shoulder and/or arm of the individual located on the seat; both the lap strap and the shoulder strap are separately connected to the lock tongue. The belt roll-up device for the lap strap may have a stronger recoil spring than does the belt roll-up device for the shoulder strap. The elasticity of the belt-strap guide may be constant over the entire length thereof, or it may increase in the direction toward the outlet opening thereof.

The belt-strap guide may comprise a hollow profile having an approximately rectangular horizontal cross section and a shoulder in the region of the outlet opening as an abutment for the lock tongue. Adjacent to the shoulder may be a widening profile section as a receiving chamber for the lock tongue. The outlet opening may be arranged in the region of a broad side of the hollow profile, and simultaneously may be equipped for at least partially receiving the lock tongue. The cross section of the hollow profile may taper in a direction toward the outlet opening. The hollow profile may have closed walls in the region of its broad sides and its narrow sides. At least one broad side wall of the hollow profile may have transversely directed folds, or may have one or more transversely directed grooves which weaken the material strength or thickness.

Alternately, the hollow profile may have one or more transversely directed slits on at least one of the broad side walls. The transversely directed slits may also extend over the narrow side wall as far as into the region of the inner side of the other broad side wall. The other broad side wall may likewise have transversely directed slits which are respectively arranged between the slits extending over the narrow side walls.

The hollow profile may be assembled from several relatively short profiled sections which are supported and/or held on at least one spring extending over the length of the belt-strap guide. Those respective sides of the profiled sections arranged to form one broad side of the belt-strap guide may be fastened to two flat springs which are parallel to each other. The profiled sections, in a plan view upon the narrow side of the belt-strap guide, may have a trapezoidal cross section and may be fastened to the flat springs with their short trapezoidal sides. The profiled sections are supported upon each other, with the safety belt open or with elongated flat springs. The broad side walls of the profiled sections, which face away from the flat springs, may have at least one longitudinal bore, which passes through while extending in the longitudinal direction of the belt-strap guide, for receiving a tension spring which extends over the length of the belt-strap guide. The profiled sections may be connected to each other in a hinged manner, and may have at least one longitudinal bore, which passes through while extending in the longitudinal direction of the belt-strap guide, for receiving a spiral spring which extends over the length of the belt-strap guide. Each profiled section may have a longitudinal bore in the region of each narrow side thereof. Each profiled section, on each narrow side thereof, may have an essentially circular recess as well as a projection having a circular cross section and projecting or extending over the underside or upper side of the profiled section, whereby the projections of one profiled section engage in a hinged manner in the recesses of the adjoining profiled section. As an assembly aid, on at least one narrow side, the projection has a V-shaped slot which is open on one side and extends in the longitudinal direction of the belt-strap guide.

The hollow profile may comprise a soft elastic rubber or synthetic material, particularly a polyurethane-integral foam having a Shore hardness of approximately 80°–90°. On the other hand, the profiled section may comprise a hard synthetic material.

The fastening end of the belt-strap guide may be embodied as a hood or cover which at least partially overlaps the belt roll-up device.

The surface of the used materials, especially synthetic materials, can be treated in such a way that it is easy and pleasant to grasp.

Referring now to the drawings in detail, FIG. 1 shows a motor vehicle safety seat, including a seat 1 and a back rest 2. A safety belt with a pelvic or lap belt or strap 3 and a diagonal shoulder belt or strap 4, as well as non-illustrated automatic belt roll-up means, are integrated in the safety seat. The free ends of the lap belt 3 and of the shoulder belt 4 are sewn to a common lock tongue 5, which has a belt lock 6 associated therewith. The lap belt 3 and the shoulder belt 4 emerge from the seat 1 or the back rest 2 at that side of the safety seat which is away from the door. The belt lock is arranged on the door side of the safety seat, and the safety belt is open in FIG. 1.

The lap belt 3 passes between the outlet thereof from the seat 1, and the lock tongue 5, through a belt-strap guide 7, which, according to FIG. 1, is fastened to the upper side of the seat 1 above the belt-strap outlet, and the free end of which forms a support for the lock tongue 5. As will be set forth subsequently in greater detail, the belt-strap guide 7 is elastically bendable. When the safety belt is open, the belt-strap guide occupies the position illustrated in FIG. 1, so that between this belt-strap guide 7, the seat 1, the rest 2, and the shoulder belt 4, there is formed a free space 8 for the arm or shoulder of a person occupying the safety seat.

Figure 2:
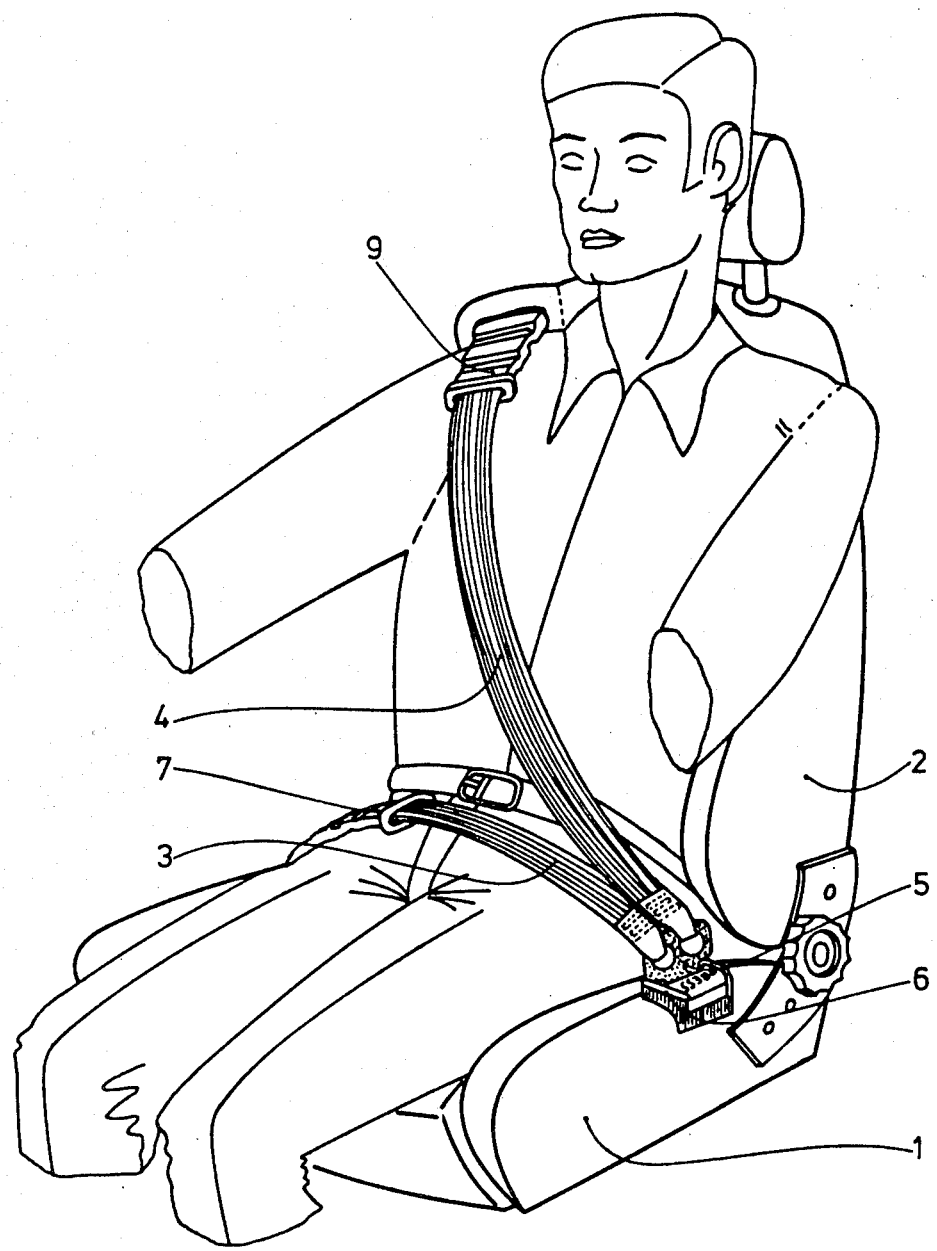
FIG. 2 shows a modification of the embodiment of FIG. 1.

FIG. 2 shows the safety seat with a person seated thereon and the safety belt closed. In this embodiment, also the shoulder belt 4, beginning at its outlet from the back rest 2, passes through a belt-strap guide 9.

The belt-strap guides 7 and 9 have a limited length of approximately 10 cm to 25 cm, and prevent that the belt straps 3 and 4, during engagement or fastening of the safety belt, are drawn in a rubbing manner over respective adjoining parts of the clothing of the person on the safety seat. Due to their elasticity, the belt straps closely engage against the particular body part of the seated person, under the influence of the forces of the belt strap.

The elasticity of the belt-strap guides 7 and 9 is constant over their length with the illustrated embodiment. Embodiments of the belt-strap guide, however, are also possible in which the elasticity changes, for instance increases, in the direction of the free end, so that the elastic forces decrease in the region of the free end. Consequently, the comfort of the fastened safety belt can be improved.

After opening the safety belt, i.e. after releasing the lock tongue 5 from the belt lock 6, which is embodied as a pressure button lock, the lap belt 3 and the shoulder belt 4 are wound up by the automatic belt roll-up means associated therewith. At the same time, the elastic return forces become effective in the belt-strap guides 7 and 9, so that they again occupy their relieved position, as illustrated, for example, in FIG. 1.

To make sure that the lock tongue 5 is always held in the same position, which is advantageous for grasping it, at the free end of the belt-strap guide 7 for the lap belt 3, the non-illustrated belt roll-up means for the lap belt 3 is provided with a stronger rewind spring than is the belt roll-up means for the shoulder belt 4.

With the embodiments illustrated in FIGS. 1 and 2, the outlet for the lap belt 3 is located on the upper side of the seat 1. Thus, the belt-strap guide 7 is connected by a flange 10 or the like to the upper side of the seat 1. However, embodiments are also possible with which the lap belt 3 skirts the appropriate side of the seat 1. A belt-strap guide 7 for such an arrangement is illustrated in FIG. 3; FIGS. 4 through 8 show embodiments modified as to the flexibility.

The belt-strap guide 7 shown in FIG. 3 comprises a hollow profile 11 with a rectangular horizontal cross section. The hollow profile 11 has two wide or broad side walls 12, 13 which are connected by narrow side walls 14. The broad side wall 12 is lengthened or extended at its lower end to form a fastening flange 15 which can be fastened with screw connections 16 to the automatic belt roll-up means or to the side of the seat. In the lower part, the broad side wall 13 is embodied as a hood 17 which can overlap a part of the belt roll-up means.

The upper free end 18 of the belt-strap guide 7 on the inside is provided with a shoulder 19 formed onto the broad side wall 12, and this shoulder 19 serves as an abutment or support for the lock tongue 5 which is sewn to the end of the belt strap. A widening section 20 in the region of the end 18 serves for at least partially receiving the lock tongue 5.

The belt-strap guide 7 comprises rubber or synthetic material, particularly polyurethane-integral-foam with a Shore hardness of approximately 80° to 90°. The elasticity and flexibility of the belt-strap guide 7 in the direction of the arrow 21 is adjustable by selecting suitable materials and/or by the wall thicknesses of the walls 12, 13 and 14.

Further possibilities for adjustment of the elasticity are included with the features shown in FIGS. 5 through 8. The embodiment illustrated in FIG. 5 provides the wide or broad side wall 12 with a series of transversely extending folds 22. With the embodiment illustrated in FIG. 6, the broad side walls 12 and 13 have externally transversely extending grooves 23 impressed thereinto which weaken the material thickness in some areas.

An even greater material weakening results with the embodiment of FIG. 7, according to which transversely extending slits 24 are provided in the broad side walls 12, 13. The slits 24 of at least one wall, for instance of the broad side wall 12, can also extend over the adjoining narrow side walls 14 as far as to the inside of the oppositely located broad side wall 13, as illustrated in FIG. 8.

FIG. 4 shows a different embodiment of the upper free end of the belt-strap guide 7, in which the shoulder 19 is formed by the upper end of the broad side wall 13, and the broad side wall 12 extends beyond and over the shoulder 19 so as to form a receiving chamber 20 for the lock tongue 5.

Figure 10:
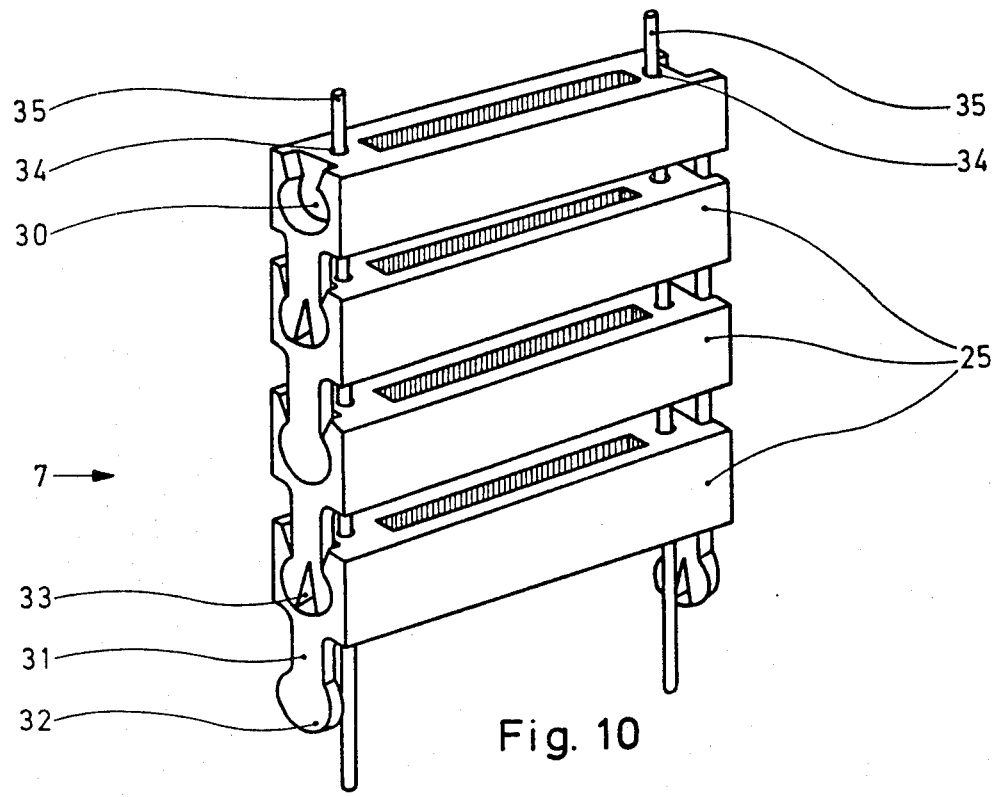
FIG. 10 shows a different embodiment of the belt-strap guide of FIG. 9.
Figure 9:
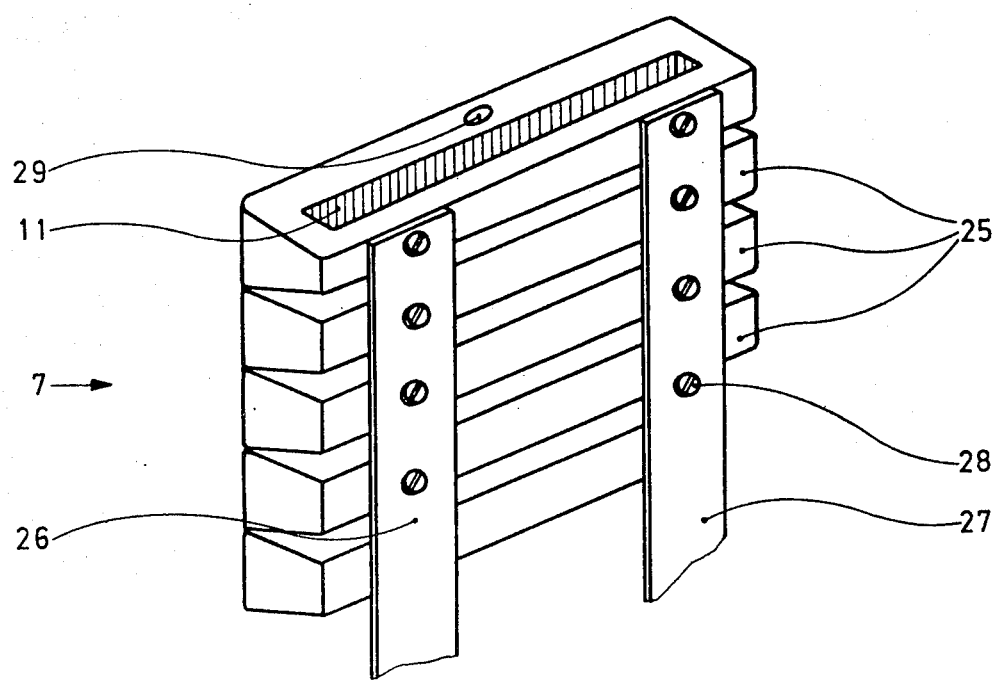
FIG. 9 illustrates a part of a belt-strap guide constructed of profiled sections.

The belt-strap guides partially illustrated in FIGS. 9 and 10 are respectively assembled from profiled sections 25. These belt-strap guides are suitable particularly for fastening on a seat of the type represented in the embodiment in FIG. 1, but they can also be arranged laterally on the seat.

With the embodiment illustrated in FIG. 9, the profiled sections 25, in plan view upon a narrow side of the belt-strap guide 7, have a trapezoidal cross section. The profiled sections 25, with their sides, which are associated with the short sides of the trapezoid, are fastened by screw connections 28 to two spring strips or flat springs 26, 27, which extend parallel to each other, in such a way that together they form the hollow profile 11. The lower, non-illustrated ends of the flat springs 26, 27 can be fastened in a suitable manner to the seat. The profiled sections 25 abut on or support each other on the side located across from the flat springs 26, 27.

For increasing the return or resetting force, the profiled sections 25, on that side which is located across from the flat springs 26, 27, are provided with a longitudinal bore 29 which extends through the corresponding wall.

The longitudinal bores 29 are aligned with each other in the functional position illustrated in FIG. 9. A non-illustrated tension spring is placed in the longitudinal bores 29, and the ends of this tension spring are fixed to the ends of the belt-strap guide 7. The tension spring can, for example, be a rubber band, a spiral or helical spring, or the like.

The profiled sections 25 illustrated in FIG. 10 are held together in a hinge-like manner. For this purpose, each profiled section 25 at both narrow sides has impressed therein circular or keyhole-shaped recesses 30 open to one side. The circular heads 32 of the projections 31 of the respective adjoining profiled section 25. The projections 31 extend from each narrow side of each profiled section 25 engage into these recesses 30 beyond the upper side or under side thereof.

For facilitating assembly, at least the head 32 of one projection 31 of each profiled segment 25 is provided with a V-shaped slot 33 which is open on one side and extends in the longitudinal direction of the belt-strap guide 7. The profiled sections 25 accordingly can be assembled or disassembled by an elastic deformation of the head halves which delimit the slots 33.

Moreover, the profiled sections 25 of the embodiment of FIG. 10 are provided in the region of each narrow side with a longitudinal bore 34. The longitudinal bores 34 align with each other in the illustrated extended or stretched position. Spiral springs 35, which are spring wires in the illustrated embodiment, are guided in the longitudinal bores 34. The spiral springs 35 are secured against dropping out at the upper and lower ends of the belt-strap guide. The strength of the spiral springs 35 is adjusted in accordance with the desired elasticity of the belt-strap guide 7.

The profiled sections 25 of the embodiment of FIGS. 9 and 10 can be made of a relatively hard synthetic material, since these profiled sections 25 themselves need not be elastic. The elasticity of the belt-strap guide 7 is attained by means of the flat springs 26, 27 or the spiral springs 35.

The present invention is, of course, in no way restricted to the specific disclosure of the specification and drawings, but also encompasses any modifications within the scope of the appended claims.

What I claim is:

1. A belt-strap guide for a safety seat for motor vehicles, said safety seat including a safety belt of at least one belt strap connected to one side of said seat, an automatic belt roll-up device connected to said seat for storing said at least one belt strap, a lock tongue connected to one end of each of said belt straps, and a belt lock connected to said seat on the opposite side thereof to said belt strap connection for receiving said lock tongue to place said safety belt in a closed condition, said belt-strap guide being a flexible, restorable belt-strap guide having one end free, with the other end being connected to at least one of said seat and said belt roll-up device, said belt-strap guide having a limited length and being hollow to form a passage for a respective belt strap which is movable in said guide in the longitudinal direction thereof, said free end of said belt-strap guide forming an outlet opening for the respective belt strap contained therein, said free end also extending essentially straight with said safety belt in the open condition, and forming furthermore shoulder means for at least partially receiving said lock tongue reachable in the region of said outlet opening, said belt-strap guide, with said safety belt in the closed condition, bending elastically, under the effect of belt-strap forces, in the direction of the path of the respective belt strap contained therein.

2. A belt-strap guide according to claim 1, in which said safety seat includes two belt straps, namely a lap strap and a shoulder strap, thus forming a three-point safety belt, a respective belt-strap guide being provided for each of said belt straps on that side of said seat to which said belt straps are connected, said belt-strap guide for said lap strap extending essentially vertically, and said belt-strap guide for said shoulder strap extending essentially horizontally, when said safety belt is in the open condition, said belt-strap guides being of such a length that a free space remains between said belt straps and said seat, both said lap strap and said shoulder strap being individually connected to said lock tongue.

3. A belt-strap guide according to claim 2, which includes a belt roll-up device for each of said belt straps, the belt roll-up device for said lap strap having a stronger recoil spring than does the belt roll-up device for said shoulder strap.

4. A belt-strap guide according to claim 1, in which the elasticity of said belt-strap guide is constant over the entire length thereof.

5. A belt-strap guide for a safety seat for motor vehicles, said safety seat including a safety belt of at least one belt strap connected to one side of said seat, an automatic belt roll-up device connected to said seat for storing said at least one belt strap, a lock tongue connected to one end of each of said belt straps, and a belt lock connected to said seat on the opposite side thereof to said belt strap connection for receiving said lock tongue to place said safety belt in a closed condition, said belt-strap guide being a flexible, restorable belt-strap guide having one end free, with the other end connected to at least one of said seat and said belt roll-up device, said belt-strap guide having a limited length and being hollow to form a passage for a respective belt strap which is movable in said guide in the longitudinal direction thereof, said free end of said belt-strap guide forming an outlet opening for the respective belt strap contained therein, said free end extending essentially straight with said safety belt in the open condition, and forming means for at least partially receiving said lock tongue in the region of said outlet opening, said belt-strap guide, with said safety belt in the closed condition, bending elastically, under the effect of belt-strap forces, in the direction of the path of the respective belt strap contained therein, the elasticity of said belt-strap guide increasing in the direction of said outlet opening thereof.

6. A belt-strap guide according to claim 5, in which said belt-strap guide comprises a hollow profile having an approximately rectangular horizontal cross section.

7. A belt-strap guide according to claim 6, in which said means in the region of said outlet opening for receiving said lock tongue comprises a shoulder which serves as an abutment for said lock tongue.

8. A belt-strap guide according to claim 7, which, adjacent to said shoulder includes a widening profiled section as a receiving chamber for said lock tongue.

9. A belt-strap guide according to claim 6, in which said hollow profile includes two broad side walls respectively interconnected by narrow side walls.

10. A belt-strap guide according to claim 9, in which said outlet opening is arranged in the region of one of said broad side walls of said hollow profile, and simultaneously forms said means for at least partially receiving said lock tongue.

11. A belt-strap guide according to claim 6, in which the cross section of said hollow profile tapers in a direction toward said outlet opening.

12. A belt-strap guide according to claim 9, in which said hollow profile has closed walls in the region of its broad and narrow side walls.

13. A belt-strap guide for a safety seat for motor vehicles, said safety seat including a safety belt of at least one belt strap connected to one side of said seat, an automatic belt roll-up device connected to said seat for storing said at least one belt strap, a lock tongue connected to one end of each of said belt straps, and a belt lock connected to said seat on the opposite side thereof to said belt strap connection for receiving said lock togue to place said safety belt in a closed condition, said belt-strap guide being a flexible, restorable belt-strap guide having one end free, with the other end connected to at least one of said seat and said belt roll-up device, said belt-strap guide having a limited length and being hollow to form a passage for a respective belt strap which is movable in said guide in the longitudinal direction thereof, said free end of said belt-strap guide forming an outlet opening for the respective belt strap contained therein, said free end extending esstentially straight with said safety belt in the open condition, and forming means for at least partially receiving said lock tongue in the region of said outlet opening, said belt-strap guide, with said safety belt in the closed condition, bending elastically, under the effect of belt-strap forces, in the direction of the path of the respective belt strap contained therein, said belt-strap guide comprising a hollow profile having an approximately rectangular horizontal cross section, said hollow profile including two broad side walls respectively interconnected by narrow side walls, at least one of said broad side walls of said hollow profile being provided with transversely extending folds.

14. A belt-strap guide for a safety seat for motor vehicles, said safety seat including a safety belt of at least one belt strap connected to one side of said seat, an automatic belt roll-up device connected to said seat for storing said at least one belt strap, a lock tongue connected to one end of each of said belt straps, and a belt lock connected to said seat on the opposite side thereof to said belt strap connection for receiving said lock tongue to place said safety belt in a closed condition, said belt-strap guide being a flexible, restorable belt-strap guide having one end free, with the other end connected to at least one of said seat and said belt roll-up device, said belt-strap guide having a limited length and being hollow to form a passage for a respective belt strap which is movable in said guide in the longitudinal direction thereof, said free end of said belt-strap guide forming an outlet opening for the respective belt strap contained therein, said free end extending essentially straight with said safety belt in the open condition, and forming means for at least partially receiving said lock tongue in the region of said outlet opening, said belt-strap guide, with said safety belt in the closed condition, bending elastically, under the effect of belt-strap forces, in the direction of the path of the respective belt strap contained therein, said belt-strap guide comprising a hollow profile having an approximately rectangular horizontal cross section, said hollow profile including two broad side walls respectively interconnected by narrow side walls, at least one of said broad side walls of said hollow profile being provided with transversely extending grooves which diminish the strength of the material of said walls.

15. A belt-strap guide for a safety seat for motor vehicles, said safety seat including a safety belt of at least one belt strap connected to one side of said seat, an automatic belt roll-up device connected to said seat for storing said at least one belt strap, a lock tongue connected to one end of each of said belt straps, and a belt lock connected to said seat on the opposite side thereof to said belt strap connection for receiving said lock tongue to place said safety belt in a closed condition, said belt-strap guide being a flexible, restorable belt-strap guide having one end free, with the other end connected to at least one of said seat and said belt roll-up device, said belt-strap guide having a limited length and being hollow to form a passage for a respective belt strap which is movable in said guide in the longitudinal direction thereof, said free end of said belt-strap guide forming an outlet opening for the respective belt strap contained therein, said free end extending essentially straight with said safety belt in the open condition, and forming means for at least partially receiving said lock tongue in the region of said outlet opening, said belt-strap guide, with said safety belt in the closed condition, bending elastically, under the effect of belt-strap forces, in the direction of the path of the respective belt strap contained therein, said belt-strap guide comprising a hollow profile having an approximately rectangular horizontal cross section, said hollow profile including two broad side walls respectively interconnected by narrow side walls, at least one of said broad side walls of said hollow profile being provided with at least one transversely extending slit.

16. A belt-strap guide according to claim 15, in which the transversely extending slits of one of said broad side walls of said hollow profile extend over at least one of said narrow side walls into the region of the inner side of the other of said broad side walls.

17. A belt-strap guide according to claim 16, in which the other broad side wall of said hollow profile is likewise provided with transversely extending slits which are respectively arranged between said slits which extend over said narrow side walls.

18. A belt-strap guide for a safety seat for motor vehicles, said safety seat including a safety belt of at least one belt strap connected to one side of said seat, an automatic belt roll-up device connected to said seat for storing said at least one belt strap, a lock tongue connected to one end of each of said belt straps, and a belt lock connected to said seat on the opposite side thereof to said belt strap connection for receiving said lock tongue to place said safety belt in a closed condition, said belt-strap guide being a flexible, restorable belt-strap guide having one end free, with the other end connected to at least one of said seat and said belt roll-up device, said belt-strap guide having a limited length and being hollow to form a passage for a respective belt strap which is movable in said guide in the longitudinal direction thereof, said free end of said belt-strap guide forming an outlet opening for the respective belt strap contained therein, said free end extending essentially straight with said safety belt in the open condition, and forming means for at least partially receiving said lock tongue in the region of said outlet opening, said belt-strap guide, with said safety belt in the closed condition, bending elastically, under the effect of belt-strap forces, in the direction of the path of the respective belt strap contained therein, a plurality of relatively short, interconnected profiled sections which are respectively provided with a hollow profile, and at least one spring which extends over the length of said belt-strap guide, said profiled sections being operatively associated with said at least one spring.

19. A belt-strap guide according to claim 18, in which said at least one spring comprises two flat springs which are parallel to one another, those respective sides of said interconnected profiled sections which are arranged in such a way as to form one broad side of said belt-strap guide are fastened to said flat springs.

20. A belt-strap guide according to claim 19, in which said profiled sections, when viewed in a direction transverse to the longitudinal direction of said belt-strap guide, have a trapezoidal cross section, the short trapezoidal side of said profiled sections being fastened to said flat springs.

21. A belt-strap guide according to claim 20, in which, with said safety belt in the open position, with elongated flat springs, said profiled sections are supported one upon the other.

22. A belt-strap guide according to claim 20, in which said profiled sections have broad side walls which face away from said flat springs, said broad side wall of said profiled sections being provided with at least one longitudinal bore which passes through while extending in the longitudinal direction of said belt-strap guide, and which includes a tension spring which is received in said longitudinal bore and extends over the length of said belt-strap guide.

23. A belt-strap guide according to claim 18, in which said profiled sections are connected to each other in a hinged manner, and are provided with at least one longitudinal bore which passes through while extending in the longitudinal direction of said belt-strap guide, and in which said at least one spring is a spiral spring which is received in said longitudinal bore and extends over the length of said belt-strap guide.

24. A belt-strap guide according to claim 23, in which each of said profiled sections has a narrow end, each of said narrow ends being provided with one of said longitudinal bores.

25. A belt-strap guide according to claim 24, in which each narrow end of said profiled sections is provided with an essentially circular recess which opens in the longitudinal direction of said belt-strap guide toward one side of said profiled section, said narrow end also being provided with a projection having a circular cross section corresponding substantially to said circular shape of said recess, said projection projecting beyond said profiled section in the direction opposite to said opening of said recess, said projections of one profiled section engaging in a hinged manner in said recesses of an adjacent profiled section.

26. A belt-strap guide according to claim 25, in which, as an assembly aid, said projection on at least one narrow end of said profiled section is provided with a V-shaped slot which extends in longitudinal direction of said belt-strap guide and opens in the direction opposite to said opening of said recess.

27. A belt-strap guide according to claim 18, in which said profiled sections comprise a hard synthetic material.

28. A belt-strap guide according to claim 6, in which said hollow profile comprises a material selected from the group consisting of soft elastic rubber and synthetic material.

29. A belt-strap guide according to claim 28, in which said hollow profile comprises a polyurethane-integral foam having a Shore hardness of approximately 80°–90°.

30. A belt-strap guide according to claim 6, in which the connected end of said belt-strap guide is embodied as a hood for at least partially overlapping said belt roll-up device.

* * * * *

UNITED STATES PATENT AND TRADEMARK OFFICE
CERTIFICATE OF CORRECTION

PATENT NO. : 4431233
DATED : 14 February 1984
INVENTOR(S) : Hans-Hellmut Ernst

It is certified that error appears in the above-identified patent and that said Letters Patent is hereby corrected as shown below:

On the title-abstract page, the foreign application priority data should read as follows:

[30] Foreign Application priority Data

February 29, 1980 [DE] Fed.Rep.of Germany ..3007645

Signed and Sealed this

Sixteenth Day of October 1984

[SEAL]

Attest:

GERALD J. MOSSINGHOFF

Attesting Officer

Commissioner of Patents and Trademarks